(12) United States Patent
Budzinski

(10) Patent No.: US 8,787,730 B2
(45) Date of Patent: Jul. 22, 2014

(54) CREATING VIDEO SYNOPSIS FOR USE IN PLAYBACK

(75) Inventor: Jeffrey Budzinski, San Jose, CA (US)

(73) Assignee: Yahoo! Inc., Sunnyvale, CA (US)

(*) Notice: Subject to any disclaimer, the term of this patent is extended or adjusted under 35 U.S.C. 154(b) by 27 days.

(21) Appl. No.: 13/477,013

(22) Filed: May 21, 2012

(65) Prior Publication Data
US 2013/0308921 A1  Nov. 21, 2013

(51) Int. Cl.
*H04N 9/80* (2006.01)

(52) U.S. Cl.
USPC .......................................................... 386/241

(58) Field of Classification Search
CPC ......... H04N 5/00; H04N 9/00; H04N 5/2625; H04N 5/85; H04N 9/80; G06F 17/30387; G06F 17/30858
See application file for complete search history.

(56) References Cited

U.S. PATENT DOCUMENTS 8,051,081 B2 * 11/2011 Shahraray et al. ............ 707/736
8,311,277 B2 * 11/2012 Peleg et al. .................... 382/103

* cited by examiner

*Primary Examiner* — Huy T Nguyen
(74) *Attorney, Agent, or Firm* — Buchenhorner Patent Law

(57) ABSTRACT

Implementing a video synopsis includes using a playback device configured to: receive a video for playing on the playback device; generating a synopsis index of video clips from the video; playing the video until the play is suspending before reaching an end of the video; checkpointing the location in the video timeline at which the video play was suspended; and storing the checkpointed location.

14 Claims, 9 Drawing Sheets

CREATING VIDEO SYNOPSIS FOR USE IN PLAYBACK

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of video playback, and more particularly relates to the field of video synopsis for playback.

BACKGROUND OF THE INVENTION

Most systems in use today provide a single video synopsis intended to act as a teaser and to entice viewers to watch. Frequently, dramatic (i.e. spoiler) moments are not included in the synopsis in order to not give away the plot line. As such the synopsis is only moderately useful to viewers resuming video playback and wishing to get "caught up."

SUMMARY OF THE INVENTION

According to an embodiment of the present invention, implementing a video synopsis includes using a playback device configured to perform steps or acts of: receiving a video for playing on the playback device; generating a synopsis index of video clips from the video; playing the video until the play is suspended before reaching the end of the video; checkpointing the location in the video timeline where the video play was suspended; and storing the checkpointed location.

According to another embodiment of the present invention, a computer-implemented system for implementing a video synopsis includes: a playback device and a storage medium operatively coupled with the playback device. The playback device includes a processor for performing the method steps of: receiving a video for playing on the playback device; generating a synopsis index of video clips from the video; playing the video until the play is suspended before reaching an end of the video; checkpointing a location in the video timeline wherein the play was suspended; and storing the checkpointed location in the storage medium.

According to another embodiment of the present invention, a computer program product including a computer-readable storage medium has computer-executable instructions therein. The computer-executable instructions enable a computer to perform steps of: receiving a video for playing on a playback device; generating a synopsis index of video clips from the video; playing the video until the play is suspended before reaching an end of the video; checkpointing the location in the video timeline where the video play was suspended; and storing the checkpointed location.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which.

Figure 1:
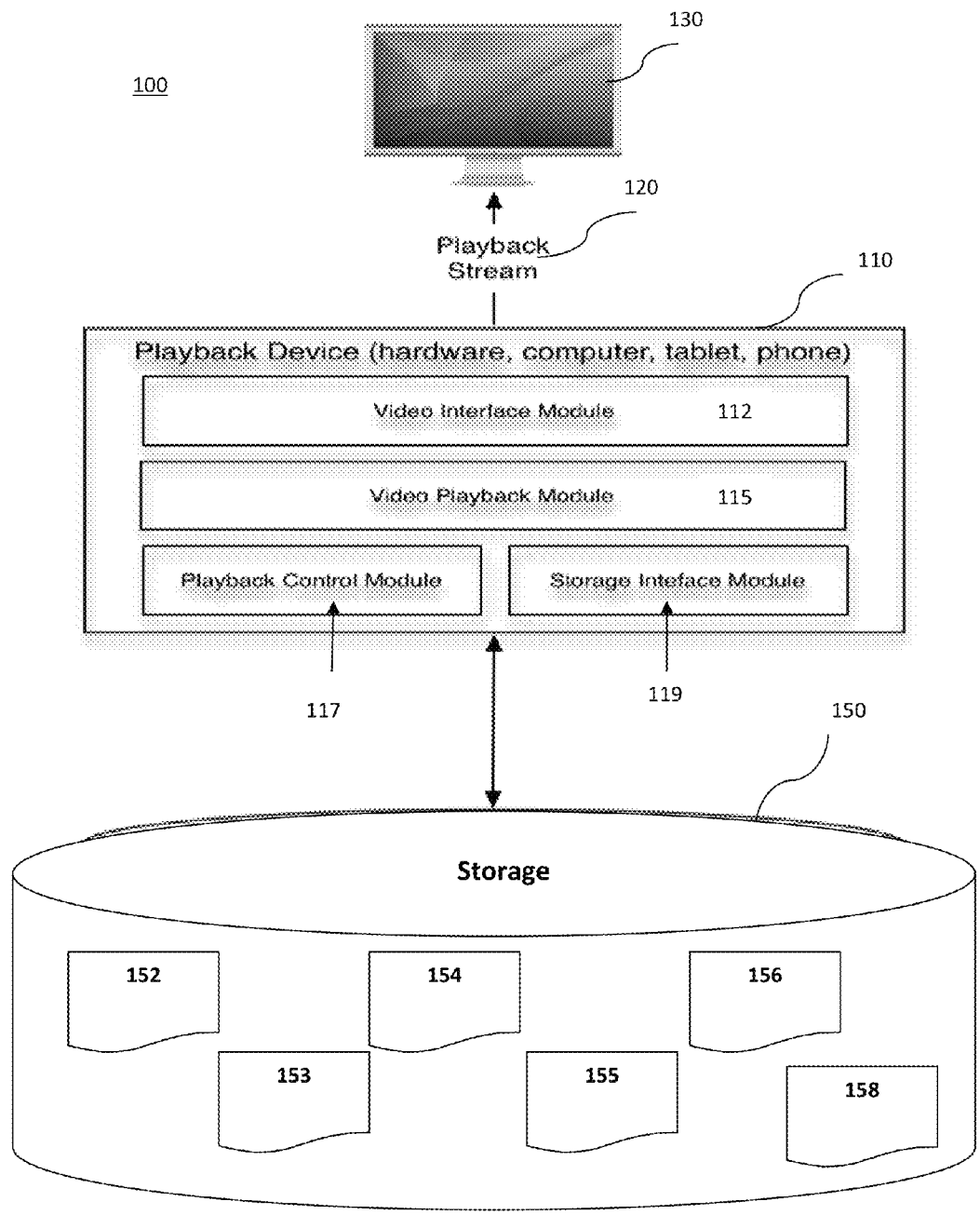
FIG. 1 is a simplified illustration of a system for video synopsis configured to operate according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a system, method, and apparatus that enables a viewer to play a variable-length video synopsis prior to resuming playback of a video. When a viewer is interrupted while watching a video of significant duration and returns at a later point in time to resume playback of the video, we provide a mechanism to enable the viewer to watch highlights (video segments) of the video up to the point at which the viewer last viewed the video. Unlike video trailers, the video synopsis according to the invention provides video highlights of the video only up to the point of suspension.

According to an embodiment of the present invention, all types of video segments can be included for the purpose of view resumption. Some types of video segments include, but are not limited to: introduction of characters, introduction of settings, key plot elements, action sequences, and scoring plays (for sporting events). Furthermore, the proposed invention plays back only those video segments that occur earlier in the video playback timeline than the last watched point. A viewer can resume a video days or weeks after interruption and get a plot line refresher as an aide to more fully enjoying the video, without revealing ("spoiling") any un-viewed segments.

Referring now to the drawings and to FIG. 1 in particular, the video synopsis system consists of the following components:
  a video playback device 110 consisting of:
  a video interface module 112;
  a video playback module 115;
  a playback control module 117; and
  a storage interface module 119; and
  a storage device 150.

In an embodiment of the present invention, we can store the following in the storage device 150: the video metadata 152 which may be indexed for sequential scans or random access; a video file 153 containing the encoded video for playback and associated metadata for locating things like chapters and sequences in/on the file/disk; the video segments 156; a single "last watched" video bookmark 158 automatically created by the replay device or software when pause, stop, power off, or eject is pressed on the replay device (or software player) and stored on the storage device; and a set of video index points and durations (a synopsis index 154) established by an editor of the video or by automated means and encoded in the video or other storage device. We can also utilize DVD (digital video disk) chapter points as "catch up" options. We can also enable "catch up" through pre-selected time intervals (for example, every 15 minutes—15, 30, 45, 60, 75 . . . ) or at a user-designated point using FF (fast forward) controls. At the point at which a user hits "Play" the user is given the option to simply play the video at the resume point or to "catch up" to that point with a synopsis.

A set of video bookmarks 155 can be a list of "time ticks" within the video timeline that represent portions of the video 152 that have been viewed. Each time tick or video bookmark 155 represents an increment of time, such as a second. We maintain a running tab of time ticks until the video is stopped, ejected, paused, or interrupted in some manner. The last recorded time tick is the last watched video bookmark (or "checkpoint") 158 before play was suspended.

The playback device 110 is operably coupled with the storage 150 to both provide and retrieve the video segments to play in a playback stream 120 on a display 130.

Figure 2:
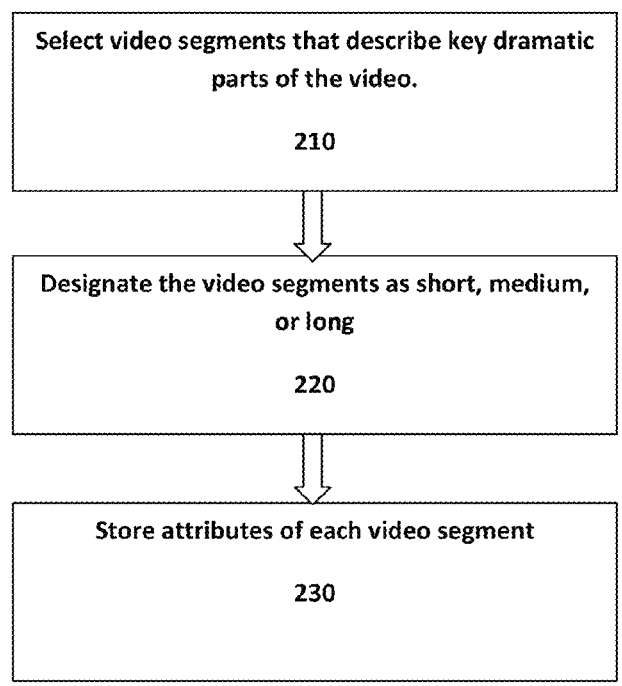
FIG. 2 is a flowchart of a method for selecting video segments for synopsis, according to an embodiment of the invention.

Referring now to the high-level flowchart of FIG. 2, the proposed solution is used as follows, in accordance with an embodiment of the present invention. In step 210 the maker of the video selects short video segments that describe key elements of the story throughout the entire video. These key elements may be dramatic moments in the plot of a movie, or perhaps play highlights in a sports video. In step 220, the maker of the video categorizes each video segment as being for short, medium, or long synopsis replay. Then, in step 230 the maker of the video stores each video segment location, length, and replay attribute (short, medium, or long) in a video synopsis index on a storage device or encoded within the video.

Figure 3:
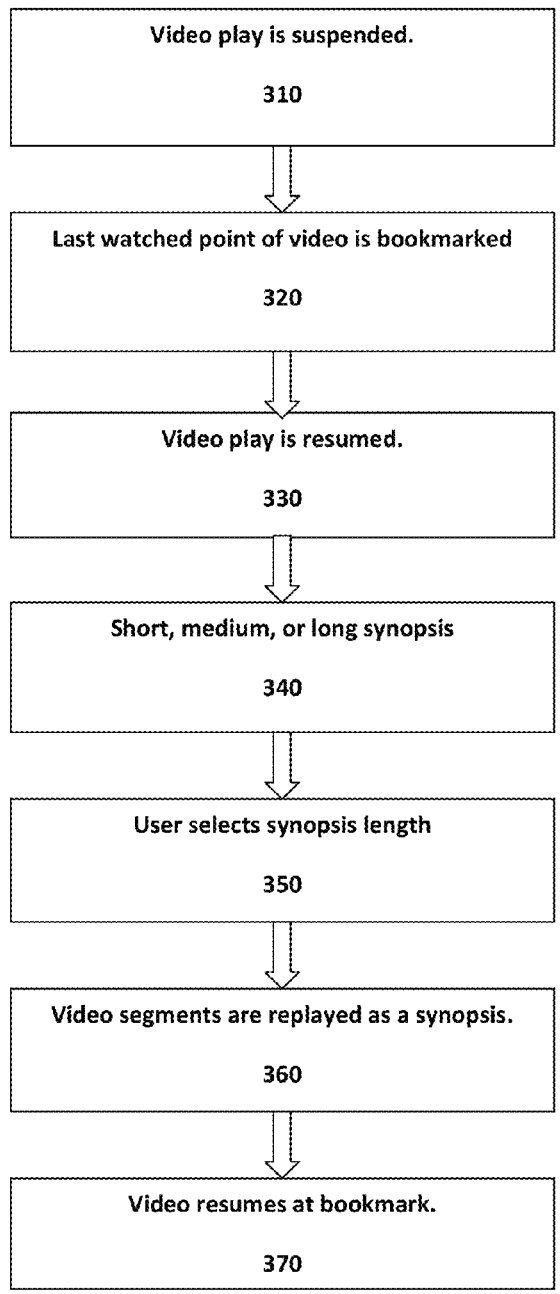
FIG. 3 is a high-level flowchart of a method for video synopsis, according to an embodiment of the present invention.

Referring now to FIG. 3, the user of the video replay device 110 ("the viewer") suspends play of the video in step 310 (either by pausing, stopping, ejecting, or powering off). The video synopsis system 100 bookmarks, or stores, the last watched point (the checkpoint) 158 when the video was suspended in step 320.

Figure 10:
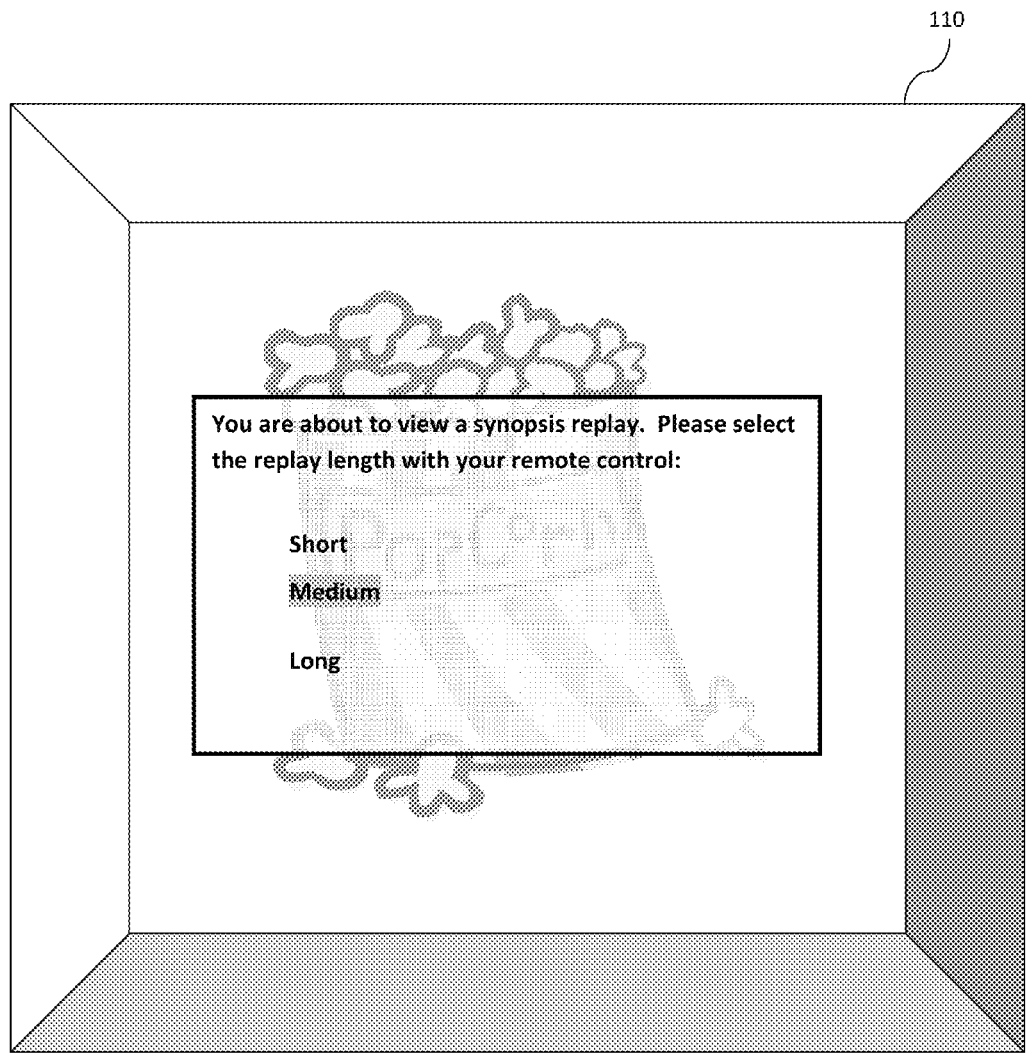
FIG. 10 is an exemplary illustration of the selection of a synopsis replay length, according to an embodiment of the present invention.

When the viewer resumes playback of the video in step 330 the viewer is asked whether he/she would like to select the short, medium, or long synopsis in step 340. FIG. 10 shows an exemplary illustration of user selection of synopsis replay length. The viewer selects the synopsis replay length in step 350. FIG. 10 shows that the user has selected a medium length synopsis. Using the viewer's selection, the video replay device 110 retrieves the stored editor-selected video segments that are categorized according to the user's selection. The video replay device 110 will only retrieve those video segments that occur earlier than the checkpointed resume point (or bookmark 158) and that correspond to the synopsis type short, medium, or long in step 360.

In an alternative implementation, the viewer does not need to provide the synopsis length; rather it can be set by the replay device 110 and/or the editor of the video. The synopsis length can be tied to the content of the video. For example, a light-hearted romance may only need a short synopsis to allow a viewer to "catch up." A long historical drama, however, may require a longer synopsis to refresh the viewer's memory. A synopsis length can also be tied to the length of the video. A video of long duration (over 2 hours) would generate a long synopsis; a short video would generate a short synopsis.

After the video replay device 110 has finished playing the video segments, video replay resumes at the video bookmark 158 in step 370. In the alternative, the user can select to play the video starting from the beginning or to resume from the last played location (the video bookmark 158). In one embodiment of the present invention, the video replay device 110 will automatically set the video to resume based on the presence or absence of the last played bookmark 158. If there is no bookmark 158 set, the video plays from the beginning.

Figure 4:
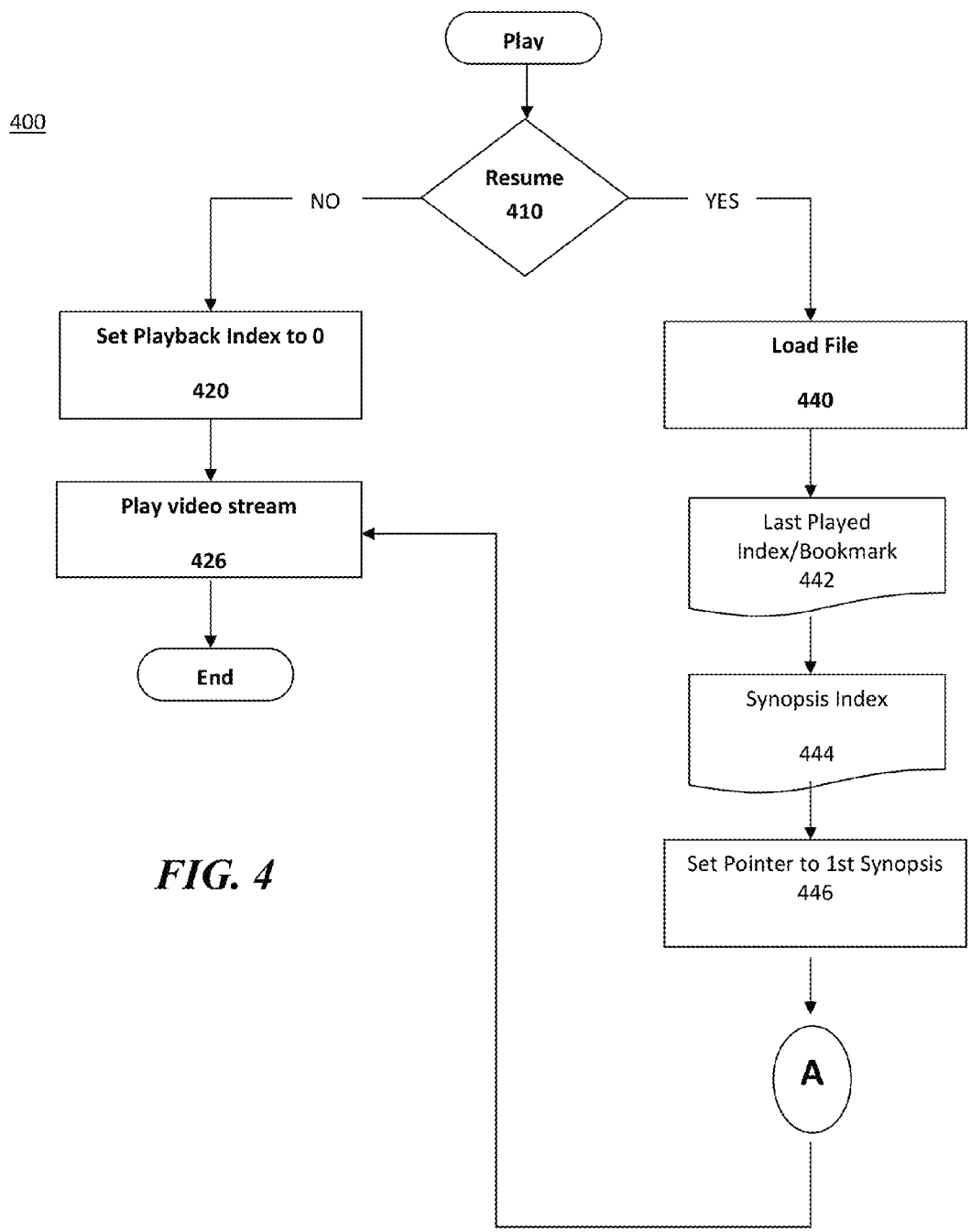
FIG. 4 is a lower-level flowchart of a method for video synopsis, according to an embodiment of the present invention.

Referring now to FIG. 4 we show a flowchart of how the video synopsis system 100 performs according to an embodiment of the present invention. Assume a video has started to play. The system 100 will determine in step 410 if this is an initial play or the resumption of a suspended play. Typically, the user will select whether to resume play from the beginning or from the last checkpoint 158. The video can also be set to resume based on the presence or absence of the bookmark 158. If no bookmark 158 is set, the replay device 110 handles this as an initial play. This option enables the system of the invention to inter-operate with videos that do not have this feature enabled.

If it is determined that this is not a resumption of a video play, then in step 420 the synopsis index pointer is set to zero. In step 426 we play the video stream.

Returning now to decision 410, if it is determined that this is a resumption of the video play, in step 440 we load the file for the video segments to play as a synopsis. We retrieve the last played index/bookmark in step 442. We retrieve the synopsis index in step 444. In step 446 we set the synopsis index pointer to the first video segment in the synopsis.

Figure 5:
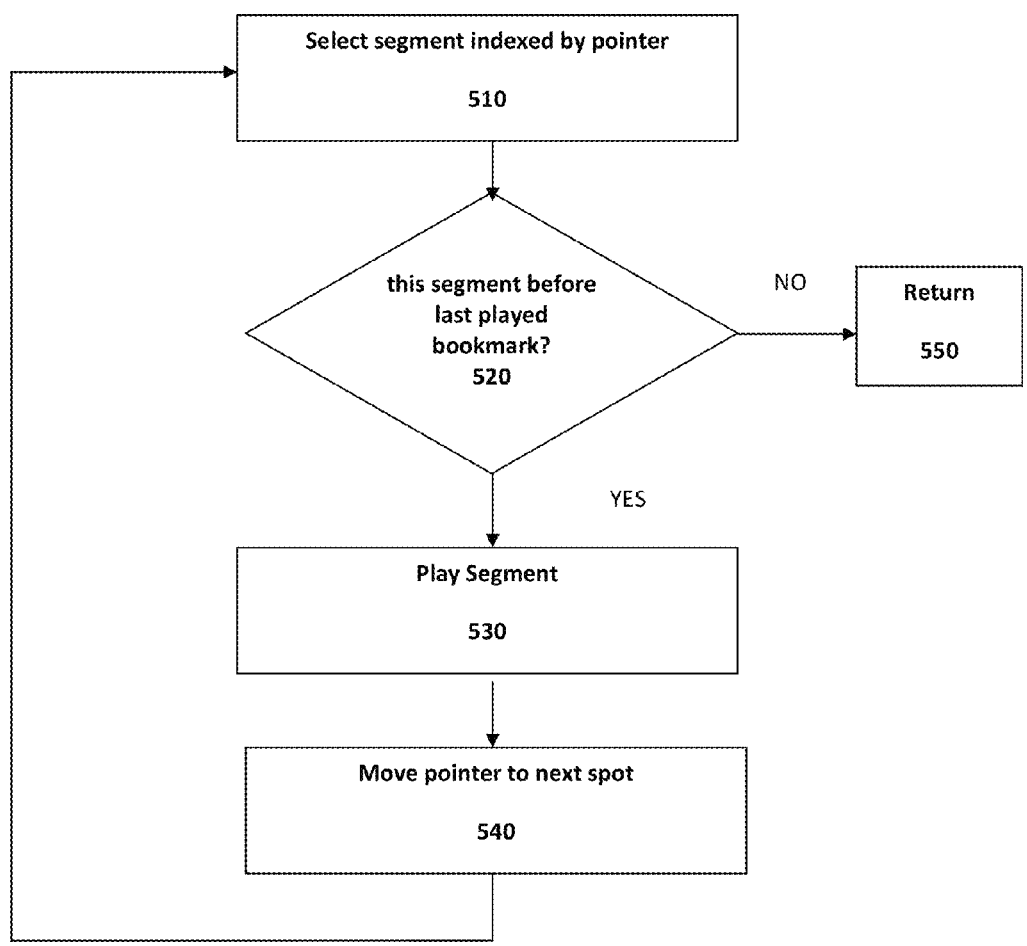
FIG. 5 is a flowchart of an inner loop within the method of FIG. 4, according to an embodiment of the present invention.

Processing continues at step 510 in the flowchart of FIG. 5 where we select the video synopsis segment indexed by the pointer. At the beginning of the loop this will be first segment.

In decision step 520 we must determine if this video synopsis segment (the one we just selected) occurs in the video timeline before the last played bookmark 158. If it does not, then in step 550 we return processing to step 426 in FIG. 4 where we resume play of the video.

If, however, step 520 determines that the subsequent video synopsis segment occurs before the last played bookmark, then in step 530 the segment is played. In step 540 we advance the synopsis index pointer to the next segment. Processing loops back to step 510 where we load the video synopsis segment indexed by the pointer.

Figure 6:
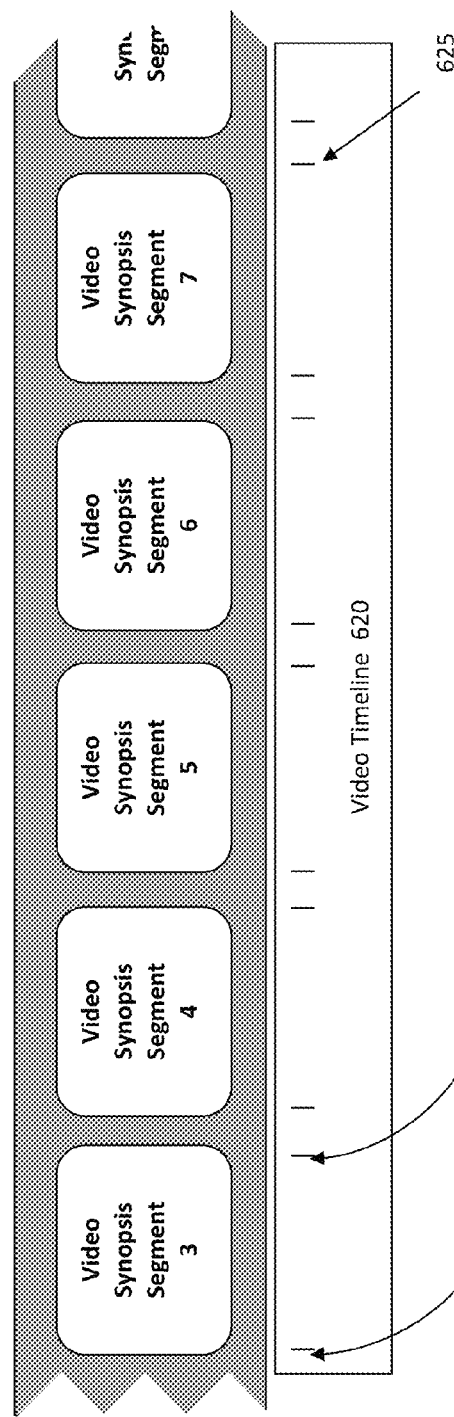
FIG. 6 is a simplified illustration of video segments used for a video synopsis, according to an embodiment of the present invention.

FIG. 6 shows a simplified illustration of the synopsis index 154 which defines the video synopsis segments 156, along with time ticks 625 indicating the start and stop times within the video timeline 620 wherein the video clips can be found. The video segments 156 are index and duration references into the video object and are described by the index 154 for the purpose of synopsis playback. The playback utilizes the synopsis index 154 to retrieve and play back the video found within 153 (perhaps necessarily referencing some meta data in 152 as well. In the case of a DVD, there are meta data files (IFO files) and then video object (encoded) files (VOB). In the case of other formats like QuickTime, both the meta data and video are contained within a single file but within a substructure similar to the meta data 152 and video file 153.

Figure 7:
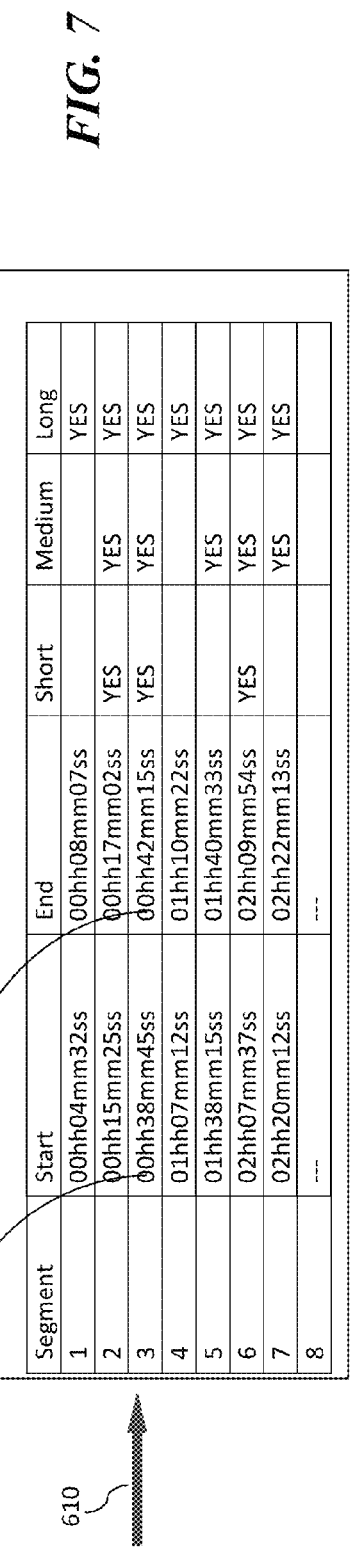
FIG. 7 is an exemplary illustration of a synopsis index, according to an embodiment of the present invention.

FIG. 7 shows an exemplary illustration of a synopsis index 154. In this example the pointer 610 is set at video clip number 3. Therefore, the next time that a video clip is to be loaded for synopsis replay, the system 100 will automatically start at video clip number 3. FIGS. 6 and 7 illustrate how the synopsis index 154 can be used to locate a video clip to play for a synopsis.

Figure 9:
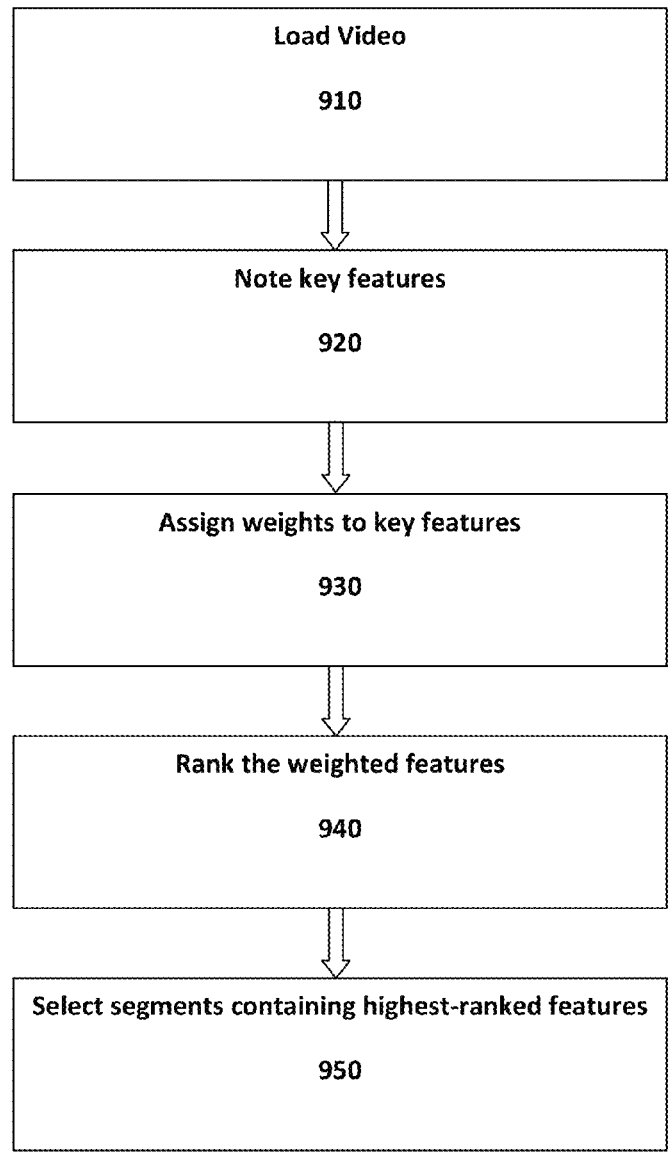
FIG. 9 is a flowchart of a method for selecting video segments, according to an embodiment of the present invention.

In a variation of the above, the video segments 156 may be selected in a fully automated manner using computer analysis rather than editorial selection. In this case, the computer analysis would automatically create and index key video segments through ranking of audio and visual content and events to determine events of the greatest significance. Referring now to FIG. 9, we show a flowchart 900 of an automated method to select video segments 156 for synopsis replay. In step 910 we load and sequence through the video. In step 920 while we sequence through the video, we note key features. Some features that can be used as input into a learning algorithm to determine playback segments in an automated fashion might include:

a) detection and location of scene transitions through fade effects;

b) analysis of audio to determine parts of the video that contain heightened dialog louder than the norm;

c) speech-to-text translation and subsequent analysis of dialog using word or phrase dictionaries to find dialog sequences that contain conflict words, romance words, or other types of classifications;

d) facial recognition to detect introduction of new characters; and e) crowd booing or cheers, or detection of score changes on score marquees, in the case of sporting events.

In step 930 we can assign weights to the features, depending on the type of video 152. For example, for a video categorized as a sports video, crowd cheering would have a higher weight assigned to it than for a video 152 classified as a romantic comedy. For a horror movie, heightened dialog would carry a higher weight than it would for a musical. These are just some examples of how weights can be assigned to video features. After weighting the key features, we rank the features in step 940. In step 950 we select for synopsis replay those segments containing the highest ranked features.

Hardware Embodiment

Figure 8:
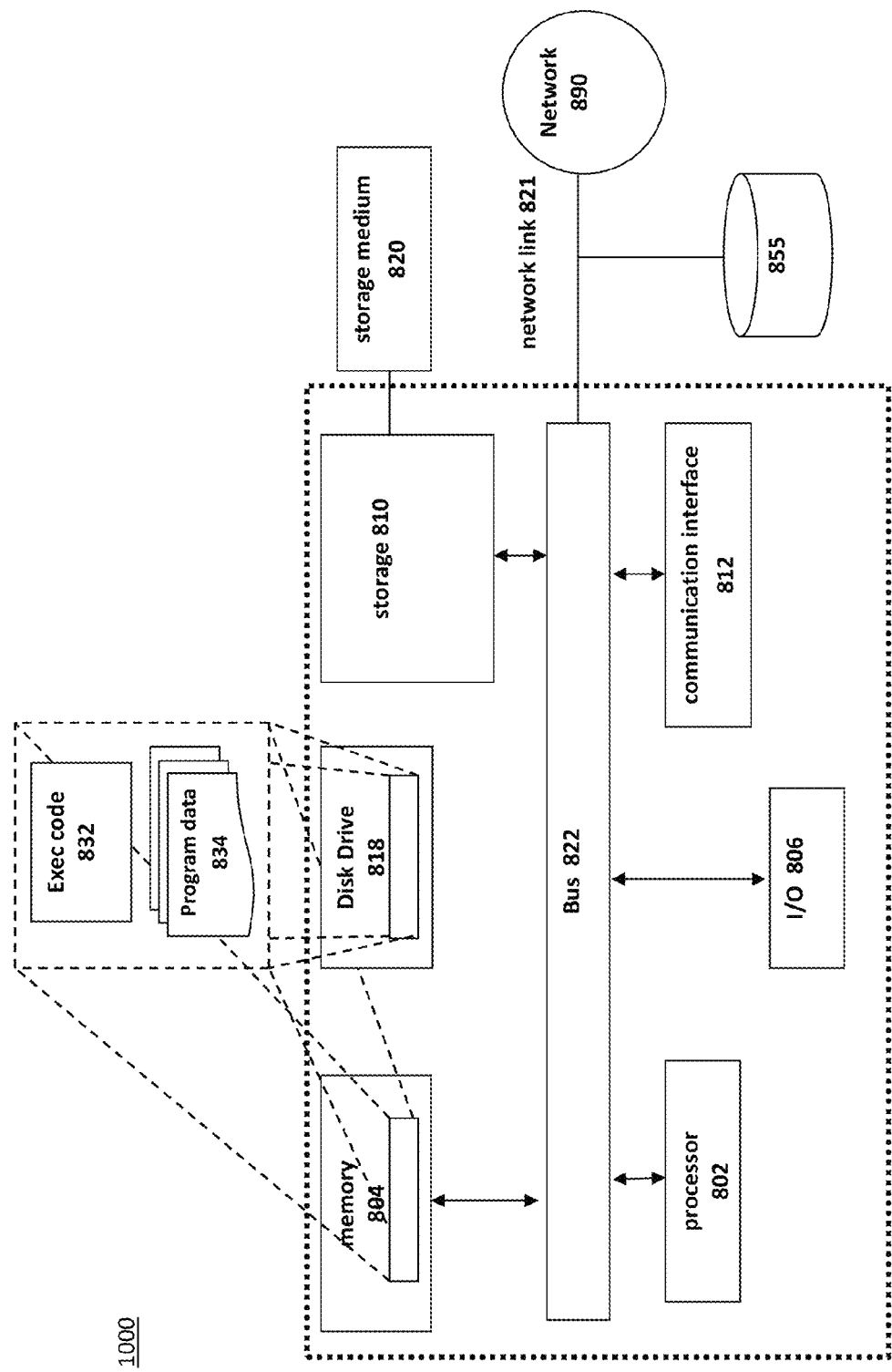
FIG. 8 is a high level block diagram showing an information processing system configured to operate according to an embodiment of the present invention.

Referring now in specific detail to FIG. 8, there is provided a simplified high-level block diagram of an information processing system 800 for generating a video synopsis for playback in which the present invention may be implemented. For purposes of this invention, computer system 800 may represent any type of computer, information processing system or other programmable electronic device, including a client computer, a server computer, a portable computer, an embedded controller, a personal digital assistant, and so on. The computer system 800 may be a stand-alone device or networked into a larger system. Computer system 800, illustrated for exemplary purposes as a networked computing device, is in communication with other networked computing devices (not shown) via network 890. As will be appreciated by those of ordinary skill in the art, network 890 may be embodied using conventional networking technologies and may include one or more of the following: local area networks, wide area networks, intranets, public Internet and the like.

In general, the routines which are executed when implementing these embodiments, whether implemented as part of an operating system or a specific application, component, program, object, module or sequence of instructions, will be referred to herein as computer programs, or simply programs. The computer programs typically comprise one or more instructions that are resident at various times in various memory and storage devices in an information processing or handling system such as a computer, and that, when read and executed by one or more processors, cause that system to perform the steps necessary to execute steps or elements embodying the various aspects of the invention.

Throughout the description herein, an embodiment of the invention is illustrated with aspects of the invention embodied solely on computer system 800, for simplicity. As will be appreciated by those of ordinary skill in the art, aspects of the invention may be distributed among one or more networked computing devices which interact with computer system 800 via one or more data networks such as, for example, network 890. However, for ease of understanding, aspects of the invention have been described as embodied in a single computing device—computer system 800.

Computer system 800 includes processing device 802 which communicates with an input/output subsystem 806, memory 804, storage 810 and network 890. The processor device 802 is operably coupled with a communication infrastructure 822 (e.g., a communications bus, cross-over bar, or network). The processor device 802 may be a general or special purpose microprocessor operating under control of computer program instructions 832 executed from memory 804 on program data 834. The processor 802 may include a number of special purpose sub-processors such as a comparator engine, each sub-processor for executing particular portions of the computer program instructions. Each sub-processor may be a separate circuit able to operate substantially in parallel with the other sub-processors.

Some or all of the sub-processors may be implemented as computer program processes (software) tangibly stored in a memory that perform their respective functions when executed. These may share an instruction processor, such as a general purpose integrated circuit microprocessor, or each sub-processor may have its own processor for executing instructions. Alternatively, some or all of the sub-processors may be implemented in an ASIC. RAM may be embodied in one or more memory chips.

The memory 804 may be partitioned or otherwise mapped to reflect the boundaries of the various memory subcomponents. Memory 804 may include both volatile and persistent memory for the storage of: operational instructions 832 for execution by processor device 802, data registers, application storage and the like. Memory 804 may include a combination of random access memory (RAM), read only memory (ROM) and persistent memory such as that provided by a hard disk drive 818. The computer instructions/applications that are stored in memory 804, such as instructions for implementing the steps of FIG. 3, are executed by processor 802. The computer instructions/applications 832 and program data 834 can also be stored in hard disk drive 818 for execution by processor device 802. Database 855 pictured here is a representation of storage for the feedback data, producer data, and consumer data and may be a plurality of databases operably coupled with a server network 890 such as the Internet through network link 821.

Those skilled in the art will appreciate that the functionality implemented within the blocks illustrated in the diagram may be implemented as separate components or the functionality of several or all of the blocks may be implemented within a single component. The I/O subsystem 806 may comprise various end user interfaces such as a display, a keyboard, and a mouse. The I/O subsystem 806 may further comprise a connection to a network 890 such as a local-area network (LAN) or wide-area network (WAN) such as the Internet.

The computer system 800 may also include storage 810, representing a magnetic tape drive, an optical disk drive, a CD-ROM drive, and the like. The storage drive 810, which can be removable, reads from and/or writes to a removable storage unit 820 in a manner well known to those having ordinary skill in the art. Removable storage unit 820, represents a compact disc, magnetic tape, optical disk, CD-ROM, DVD-ROM, etc. which is read by and written to by removable storage drive 810. As will be appreciated, the removable storage unit 820 includes a non-transitory computer readable medium having stored therein computer software and/or data for implementing the real-time feedback collection system.

The computer system 800 may also include a communications interface 812. Communications interface 812 allows software and data to be transferred between the computer system and external devices. Examples of communications interface 812 may include a modem, a network interface (such as an Ethernet card), a communications port, a PCM-CIA slot and card, etc. Software and data transferred via communications interface 812 are in the form of signals which may be, for example, electronic, electromagnetic, optical, or other signals capable of being received by communications interface 812.

I claim:

1. A method for implementing a video synopsis, comprising steps of:
   using a playback device comprising a processor performing steps of:
      receiving a video for playing on the playback device;
      generating a synopsis index of video clips from the video by performing:
         selecting the video clips that describe key moments in the video, each video clip comprising attributes of: a time tick within the video timeline where said video clip starts, and a time duration of said video clip; and
         storing the attributes of each video clip in the synopsis index, along with an identifier for each video clip;
      wherein a time-ordered set of video clips comprises a synopsis of the video; and
      adding an additional attribute comprising a synopsis replay length for each video clip identified in the synopsis index, wherein the synopsis replay length is selected from a group consisting of: short, medium, and long;
      playing the video until the play is suspended before reaching an end of the video;
      checkpointing a location in a video timeline of the video where the video play was suspended; and
      storing the checkpointed location.

2. The method of claim 1 further comprising:
   receiving an indication that the video play is to be resumed;
   playing the synopsis of the video, said synopsis comprising the video clips occurring in the video timeline only up to the checkpointed location; and
   resuming play of the video at the checkpointed location when the synopsis terminates.

3. The method of claim 2 wherein playing the synopsis comprises:
   retrieving the checkpointed location where the video play was suspended;
   retrieving the synopsis index;
   retrieving the video clips referenced in the synopsis index; and
   playing the synopsis.

4. The method of claim 3 wherein playing the synopsis comprises:
   playing a first video clip as identified in the synopsis index;
   performing an iterative loop beginning with a video clip pointer set to one, said iterative loop comprising:
      loading a next video clip as referenced by the video clip pointer;
      comparing the time tick of the next video clip with a time of the checkpointed location; and
      playing the next video clip when the time tick occurs before the time of the checkpointed location;
   setting a video clip pointer to the checkpointed location upon reaching an end of the iterative loop.

5. The method of claim 4 further comprising:
   receiving a selection of the synopsis replay length;
   comparing the synopsis replay length attribute of the next video clip with the selection received from the viewer; and
   wherein playing the next video clip further comprises playing said next video clip when the synopsis replay length attribute matches the selection received from the viewer.

6. The method of claim 5 wherein the selection of the synopsis replay length is received from the viewer.

7. The method of claim 5 wherein the selection of the synopsis replay length is derived by the playback device.

8. The method of claim 1 wherein storing the checkpointed location comprises storing an encoding of said checkpointed location in the video.

9. The method of claim 1 wherein selecting the video clips that describe the key moments in the video comprises:
   determining a type of the video;
   noting key features of the video while sequencing through said video;
   assigning weights to the key features, wherein said weights are assigned based on the type of the video;
   ranking the weighted features; and
   selecting for synopsis replay the video segments containing highest-ranked features.

10. A computer-implemented system for implementing a video synopsis, comprising:
    a playback device; and a storage medium operatively coupled with the playback device;
wherein the playback device comprises a processor performing steps of:
receiving a video for playing on the playback device;
generating a synopsis index of video clips from the video by performing:
selecting the video clips that describe key moments in the video, each video clip comprising attributes of: a time tick within the video timeline where said video clip starts, and a time duration of said video clip; and
storing the attributes of each video clip in the synopsis index, along with an identifier for each video clip;
wherein a time-ordered set of video clips comprises a synopsis of the video; and
adding an additional attribute comprising a synopsis replay length for each video clip identified in the synopsis index, wherein the synopsis replay length is selected from a group consisting of: short, medium, and long;
playing the video until the play is suspended before reaching an end of the video;
checkpointing a location in a video timeline of the video where the video play was suspended; and
storing the checkpointed location in the storage medium.

11. The computer-implemented system of claim 10 wherein the checkpointed location is encoded in the video.

12. The computer-implemented system of claim 10 wherein the synopsis replay length is derived by the playback device according to a category of the video.

13. The computer-implemented system of claim 10 wherein the playback device further comprises an input/output interface performing:
requesting that a viewer select the synopsis replay length; and
receiving the synopsis replay length selected by the viewer.

14. A computer program product comprising a non-transitory computer-readable storage medium with computer-executable instructions stored therein, said computer-executable instructions enabling a computer to perform:
using a playback device performing steps of:
receiving a video for playing on the playback device;
generating a synopsis index of video clips from the video by performing:
selecting the video clips that describe key moments in the video, each video clip comprising attributes of: a time tick within the video timeline where said video clip starts, and a time duration of said video clip; and
storing the attributes of each video clip in the synopsis index, along with an identifier for each video clip;
wherein a time-ordered set of video clips comprises a synopsis of the video; and
adding an additional attribute comprising a synopsis replay length for each video clip identified in the synopsis index, wherein the synopsis replay length is selected from a group consisting of: short, medium, and long;
playing the video until the play is suspended before reaching an end of the video;
checkpointing a location in a video timeline of the video where the video play was suspended; and
storing the checkpointed location.

* * * * *